(12) United States Patent
Kang et al.

(10) Patent No.: US 11,366,608 B2
(45) Date of Patent: Jun. 21, 2022

(54) METHOD, ELECTRONIC DEVICE AND COMPUTER READABLE STORAGE MEDIUM FOR I/O MANAGEMENT

(71) Applicant: EMC IP Holding Company LLC, Hopkinton, MA (US)

(72) Inventors: Jianbin Kang, Beijing (CN); Geng Han, Beijing (CN); Jibing Dong, Beijing (CN); Hongpo Gao, Beijing (CN); Haiying Tang, Beijing (CN); Xinlei Xu, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 16/354,767

(22) Filed: Mar. 15, 2019

(65) Prior Publication Data
US 2020/0026467 A1    Jan. 23, 2020

(30) Foreign Application Priority Data
Jul. 20, 2018    (CN) .......................... 201810802046.3

(51) Int. Cl.
*G06F 11/10*    (2006.01)
*G06F 3/06*    (2006.01)

(52) U.S. Cl.
CPC ............ *G06F 3/0659* (2013.01); *G06F 3/061* (2013.01); *G06F 3/0644* (2013.01); *G06F 3/0689* (2013.01); *G06F 11/1076* (2013.01)

(58) Field of Classification Search
CPC .............................. G06F 11/10; G06F 11/1076

USPC ....................................................... 714/6.24
See application file for complete search history.

(56) References Cited

U.S. PATENT DOCUMENTS

| | | | | |
|---|---|---|---|---|
| 7,051,155 B2 * | 5/2006 | Talagala | ............... | G06F 11/1076 711/114 |
| 7,290,196 B1 * | 10/2007 | Annayya | ............. | H03M 13/091 714/758 |
| 7,694,119 B1 * | 4/2010 | Scharland | ............... | G06F 3/067 713/1 |
| 8,539,197 B1 * | 9/2013 | Marshall | ................. | G06F 13/00 711/173 |
| 8,700,951 B1 * | 4/2014 | Call | .................... | G06F 11/0727 714/6.24 |
| 8,751,862 B2 * | 6/2014 | Cherian | ............. | G06F 11/1092 714/6.24 |
| 9,268,644 B1 * | 2/2016 | Subramanian | ...... | G06F 11/1435 |
| 10,339,021 B2 | 7/2019 | Ku et al. | | |

(Continued)

*Primary Examiner* — Kamini B Patel
(74) *Attorney, Agent, or Firm* — BainwoodHuang

(57) ABSTRACT

Techniques perform I/O management. The techniques involve: in response to receiving an I/O request for a redundant array of independent disks (RAID), determining a stripe of the RAID related to the I/O request; determining metadata corresponding to the stripe, the metadata indicating validity of current data in a corresponding data block of the RAID, the data block comprising one or more stripes; in response to the metadata indicating that the current data is valid, executing the I/O request by accessing the RAID; and in response to the metadata indicating that the current data is invalid, responding to the I/O request with zero data as the current data. Accordingly, disk access is reduced, metadata cache efficiency is increased, I/O performance is improved and the RAID reliability is enhanced.

21 Claims, 6 Drawing Sheets

(56) References Cited

U.S. PATENT DOCUMENTS

| | | | |
|---|---|---|---|
| 10,402,091 B1 | 9/2019 | Vankamamidi et al. | |
| 10,430,279 B1* | 10/2019 | Dittia | G06F 3/0688 |
| 10,509,581 B1* | 12/2019 | Abrol | G06F 3/064 |
| 10,552,322 B2 | 2/2020 | Hu et al. | |
| 10,606,709 B1* | 3/2020 | Bansal | G06F 9/5072 |
| 10,705,760 B2* | 7/2020 | Dong | G06F 3/0611 |
| 10,740,187 B1 | 8/2020 | Prabhakar et al. | |
| 10,789,170 B2 | 9/2020 | Kang et al. | |
| 2003/0145270 A1* | 7/2003 | Holt | G11B 20/1833 714/766 |
| 2004/0024963 A1* | 2/2004 | Talagala | G06F 11/1076 711/114 |
| 2007/0118554 A1* | 5/2007 | Chang | G06F 16/48 |
| 2008/0282105 A1* | 11/2008 | Deenadhayalan | G06F 11/1076 714/6.12 |
| 2009/0138862 A1* | 5/2009 | Tanabe | G06F 8/456 717/149 |
| 2010/0088579 A1* | 4/2010 | Hafner | G06F 11/1076 714/807 |
| 2011/0234614 A1* | 9/2011 | Ohyama | G09G 5/06 345/589 |
| 2014/0310483 A1* | 10/2014 | Bennett | G06F 3/0619 711/154 |
| 2016/0170639 A1* | 6/2016 | Velayudhan | G06F 3/061 711/114 |
| 2018/0089088 A1* | 3/2018 | Jakowski | G06F 12/0607 |
| 2019/0332325 A1* | 10/2019 | Dong | G06F 3/0659 |

* cited by examiner

METHOD, ELECTRONIC DEVICE AND COMPUTER READABLE STORAGE MEDIUM FOR I/O MANAGEMENT

CROSS-REFERENCE TO RELATED APPLICATION(S)

This application claims priority to Chinese Patent Application No. CN201810802046.3, on file at the China National Intellectual Property Administration (CNIPA), having a filing date of Jul. 20, 2018, and having "METHOD, ELECTRONIC DEVICE AND COMPUTER READABLE STORAGE MEDIUM OF I/O MANAGEMENT" as a title, the contents and teachings of which are herein incorporated by reference in their entirety.

FIELD

Embodiments of the present disclosure relate to the computer field, and more specifically, to a method, device and computer-readable medium of an input/output (I/O) management of a redundant array of independent disks (RAID).

BACKGROUND

RAID is a data storage virtualization technology that combines multiple physical drive components (e.g., disks) into a single logical unit for the purposes of data redundancy, performance improvement, or both. Data is distributed across the physical drive components in one of several ways, referred to as RAID levels, depending on the required levels of redundancy and performance.

At present, disks such as a solid-state drive (SSD) store data in flash memory cells. The flash memory cells can only be directly written when they are empty, otherwise, they must be erased first, which brings the issue of write amplification. For this reason, it is proposed to separately indicate, for respective disks in the RAID, which data blocks on the disks are out of use and can be internally wiped. When write is performed for these data blocks, there is no need to read the contents of the data blocks to store them in the cache. Instead, these data blocks can be directly erased and written, which reduces the write amplification. However, the overall I/O performance still degrades greatly in case of a large I/O load for the RAID.

SUMMARY

According to example embodiments of the present disclosure, there is provided an improved solution of I/O management.

In a first aspect of the embodiments of the present disclosure, there is provided a method of I/O management. The method includes: in response to receiving an I/O request for a redundant array of independent disks (RAID), determining a stripe of the RAID related to the I/O request; determining metadata corresponding to the stripe, the metadata indicating validity of current data in a corresponding data block of the RAID, the data block including one or more stripes; in response to the metadata indicating that the current data is valid, executing the I/O request by accessing the RAID; and in response to the metadata indicating that the current data is invalid, responding to the I/O request with zero data as the current data.

In a second aspect of the embodiments of the present disclosure, there is provided an electronic device. The electronic device includes: a processing unit; and a memory storing instructions which, when executed by the processing unit, cause the electronic device to: in response to receiving an I/O request for a redundant array of independent disks (RAID), determine a stripe of the RAID related to the I/O request; determine metadata corresponding to the stripe, the metadata indicating validity of current data in a corresponding data block of the RAID, the data block including one or more stripes; in response to the metadata indicating that the current data is valid, execute the I/O request by accessing the RAID; and in response to the metadata indicating that the current data is invalid, respond to the I/O request with zero data as the current data.

In a third aspect of the embodiments of the present disclosure, there is provided a computer-readable medium. The computer-readable medium has a computer program stored thereon which, when executed by a processor, implements the method according to the first aspect of the present disclosure.

It should be appreciated that the contents described in this Summary are not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages and aspects of every embodiment of the present disclosure will become more apparent. In the drawings, same or similar reference signs indicate the same or similar elements, wherein.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more details with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are only by way of example rather than restricting the protection scope of the present disclosure.

In the descriptions of the embodiments of the present disclosure, the term "includes" and its variants are to be read as open-ended terms that mean "includes, but is not limited to." The term "based on" is to be read as "based at least in part on." The terms "one embodiment" and "this embodiment" are to be read as "at least one embodiment." The terms "first" and "second" and the like may refer to different or same objects. The following text also can include other explicit and implicit definitions. Moreover, the terms "I/O," "I/O request" and "I/O operations" can be used interchangeably in the description of the embodiments of the present disclosure for the sake of convenience.

Figure 1:
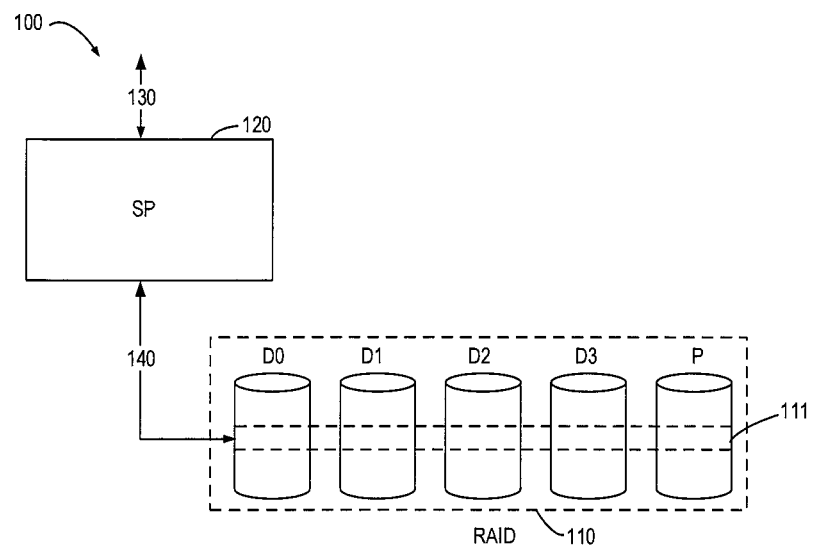
FIG. 1 illustrates a schematic diagram of an example scenario in which embodiments of the present disclosure can be implemented.

FIG. 1 illustrates a schematic diagram 100 of an example scenario in which embodiments of the present disclosure can be implemented. As shown in FIG. 1, an RAID 110 can serve a processor (SP) 120. Only one processor is illustrated here as a matter of convenience. In fact, the RAID 110 can serve a plurality of processors simultaneously and the present application is not restricted in this regard. SP can be a storage server or a storage terminal per se or a part thereof.

As an example, FIG. 1 illustrates the case in 4+1 RAID5. As shown in FIG. 1, each disk in the RAID group is divided into a set of disk elements of fixed size. Each element usually contains 128 sectors, which sector is 64K bytes. Disk elements, which have the same logical block address (LBA) and come from different disks, e.g., D0, D1, D2, D3 and a parity check bit P shown in FIG. 1, will form a stripe, such as a stripe 111 of FIG. 1. In this stripe, one element is a parity check bit and the rest elements are data. It should be appreciated that the present application is not restricted to the RAID5 shown and can be suitable for other already known or to be developed RAIDs of any types or similar storage arrays.

As shown in FIG. 1, in response to receiving an I/O request 130 for the RAID 110, the SP 120 can access 140 the RAID 110 to execute the I/O request. On the assumption that the I/O request 130 involves the stripe 111, the SP 120 accesses 140 the stripe 111 to execute the I/O request, which means accessing data blocks in respective disks D0, D1, D2, D3 and P corresponding to the stripe 111 separately.

Figure 2:
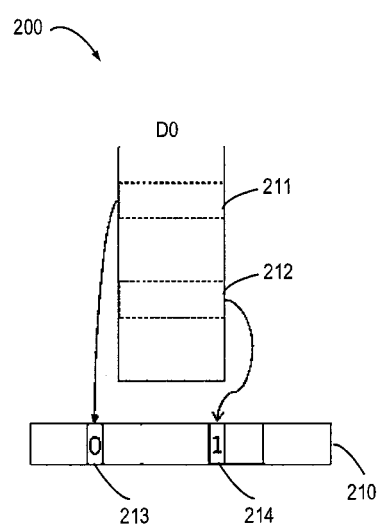
FIG. 2 illustrates a schematic diagram of processing I/O requests in a traditional solution.

Usually, corresponding metadata is separately maintained for respective disks D0, D1, D2, D3 and P to indicate validity of data in respective data blocks of the corresponding disk. A procedure of executing the I/O request for each disk in combination with the metadata is explained below with reference to FIG. 2. FIG. 2 illustrates a schematic diagram 200 of processing an I/O request in a traditional solution. Because the processing procedure is similar to respective disks, only the disk D0 is taken as an example here for illustration.

As shown in FIG. 2, metadata 210 is maintained for the disk D0. For example, the metadata 210 includes metadata bits 213 and 214 respectively for data blocks 211 and 222 in the disk D0 and the metadata bits 213 and 214 respectively indicate 0 and 1. In the example, 0 represents that the current data block is valid (already mapped, i.e., still will be used and cannot be internally wiped) and 1 represents that the current data block is invalid (unmapped, i.e., out of use and can be internally wiped).

It is assumed that the data block in the disk D0 related to the stripe 111 is the data block 211. For example, when the I/O request 130 is a read operation for the stripe 111, as the metadata bit 213 corresponding to the data block 211 is 0 indicating that the data block is valid, the data block 211 of the disk D0 can be directly read. When the I/O request 130 is a write operation for the stripe 111, as the metadata bit 213 corresponding to the data block 211 is 0, corresponding write-in data included in the I/O request 130 can be directly written into the data block 211 in the disk D0.

It is assumed that the data block in the disk D0 related to the stripe 111 is the data block 212. For example, when the I/O request 130 is a read operation for the stripe 111, as the metadata bit 214 corresponding to the data block 212 is 1 indicating that the data block is invalid, zero data can be directly returned without reading the disk D0. When the I/O request 130 is a write operation for the stripe 111, as the metadata bit 214 corresponding to the data block 212 is 1 indicating that the data block is invalid, zero data can be directly written into the data block 211 of the disk D0, and then the corresponding write-in data included in the I/O request 130 is written into the data block 211 into which the zero data has been written.

Accordingly, metadata indicative of data validity is separately maintained for the respective disks in the traditional solution and such work is well performed in case of small I/O load. However, the I/O performance greatly reduces under large I/O load. This is because the cache space for the metadata is limited and the cache will soon be invalidated, which further requires the I/O to access the data on the disk.

Furthermore, the metadata maintained for the disks is stored on corresponding disks. If the area for the metadata fails, the data on the disk becomes unreliable and it is required to rebuild the data on all disks, which will increase data loss windows of the RAID and affect reliability of the entire storage system.

The inventor notices that when a plurality of disks is combined to create a RAID group, the data of each disk in the same RAID stripe is correlated. If a part of the stripe is written, the entire stripe may be written finally. As shown in FIG. 1, if the data position on the disk D0 corresponding to the stripe 111 is written, it is required to update a parity check bit on the corresponding disk P and data positions on other disks D1, D2 and D3 corresponding to the stripe 111 may also be updated because the data on these data positions is continuous.

Therefore, the basic concept of the present application is in maintaining metadata indicative of data validity for the entire RAID (at an RAID level) rather than for respective disks (at a disk level). In other words, the metadata indicative of data validity is maintained for one or more stripes of the RAID, which can reduce the I/O operations on the disks, improve the overall I/O performance, boost metadata cache efficiency and enhance the reliability of the RAID. Detailed explanations are provided below with reference to FIGS. 3 to 5.

Figure 3:
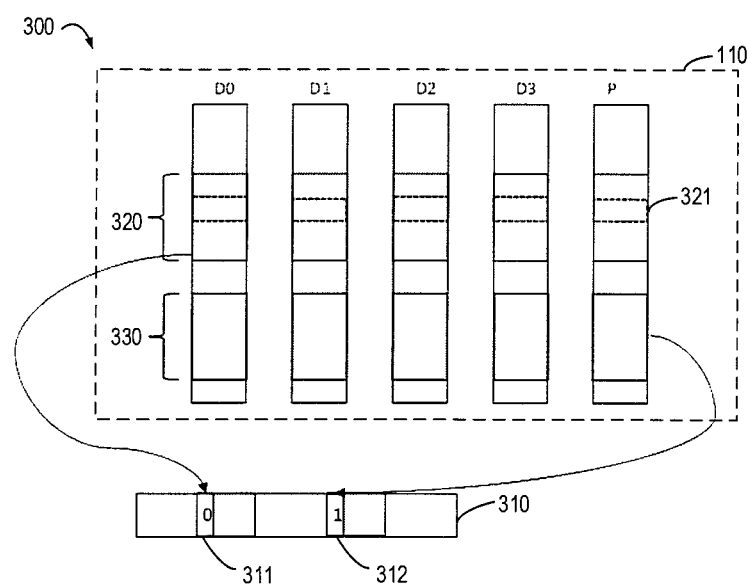
FIG. 3 illustrates a schematic diagram of creating metadata in accordance with embodiments of the present disclosure.

FIG. 3 illustrates a schematic diagram 300 of creating metadata in accordance with embodiments of the present disclosure. According to embodiments of the present disclosure, metadata 310 can be maintained for respective data blocks or data chunks of the RAID 110. The data block or data chunk includes one or more stripes (e.g., stripe 321 shown by FIG. 3). According to embodiments of the present disclosure, the metadata 310 can indicate validity of data in the respective data blocks or data chunks. As shown in FIG. 3, for example, the metadata 310 includes metadata bits 311 and 312 respectively for the data blocks 320 and 330 and the metadata bits 311 and 312 separately indicate 0 and 1. In this example, 0 represents that the data in the current data block is valid and 1 represents that the data in the current data block is invalid. It should be understood that the present application is not restricted to this and validity of data in the current data block also can be indicated through other indication manners. For example, one metadata bit is used for indicating validity of data in a plurality of data blocks. Therefore, the metadata indicative of data validity can be maintained at the RAID level and one metadata bit is used to indicate validity of more data, so as to save the storage space for the metadata, boost the metadata cache efficiency and reduce the I/O operations on the disk at the same time.

Figure 4:
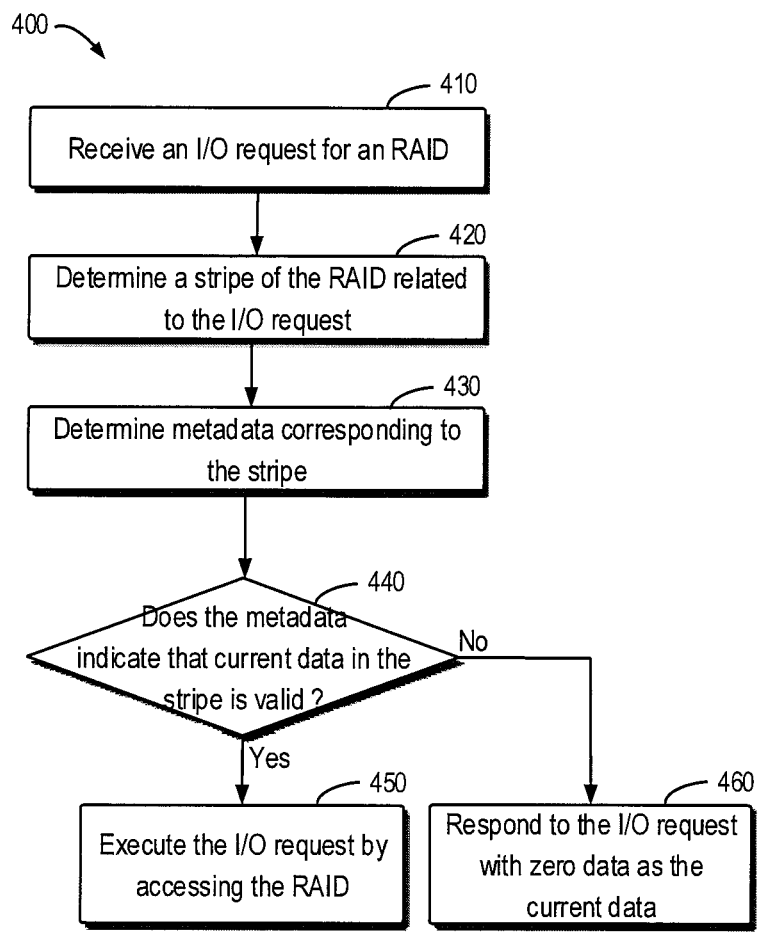
FIG. 4 illustrates a flowchart of a method for processing I/O requests in accordance with one embodiment of the present disclosure.

The procedure of processing an I/O request in accordance with embodiments of the present disclosure is described in details below with reference to FIGS. 4 to 5. FIG. 4 illustrates a flowchart of a method 400 for processing I/O requests in accordance with one embodiment of the present disclosure. The method 400 can be implemented, for example, at the SP 120 of FIG. 1. It should be appreciated that the method 400 can be implemented at any storage servers or storage terminals including the SP 120 of FIG. 1.

As shown in FIG. 4, an I/O request for the RAID is received at block 410. For example, an I/O request 130 for the RAID 110 can be received from the user via the SP 120 of FIG. 1. According to embodiments of the present disclosure, the I/O request at least can include a LBA range, a type of the request and the like.

At block 420, a stripe related to the I/O request in the RAID is determined. According to embodiments of the present disclosure, the stripe in the RAID directed against by the I/O request can be determined based on the LBA range included in the I/O request. For example, the stripe in the RAID related to the I/O request can be determined based on the mapping from a logical address to a physical address and the corresponding relation between a physical address and a stripe. According to embodiments of the present disclosure, the I/O request can relate to one or more stripes in the RAID and the present application is not restricted in this regard.

At block 430, metadata corresponding to the stripe is determined. According to embodiments of the present disclosure, the metadata can be stored in the RAID after the creation of the metadata described with reference to FIG. 3. Hence, the metadata can be redundantly protected, which further improves the RAID reliability. It is certain that the metadata also can be stored in any storage devices apart from the RAID in accordance with an alternative embodiment of the present disclosure. The present application is not restricted in this regard.

As described above with reference to FIG. 3, the metadata can be created for a corresponding data block (that is, one or more stripes) in the RAID. Therefore, based on the stripe determined at block 420, a metadata value corresponding to the stripe can be determined.

At block 440, it is judged whether the metadata determined at 430 indicates that the current data in the stripe is valid. If it is decided that the current data is valid, the method 400 enters the block 450 to execute the I/O request by accessing the RAID. According to one embodiment of the present disclosure, in response to the I/O request being a read operation, the current data in the stripe of RAID can be read as the result of the read operation. According to a further embodiment of the present disclosure, in response to the I/O request being a write operation, write-in data included in the I/O request can be written into the stripe of the RAID.

If it is decided, at block 440, that the current data is invalid, the method 400 enters the block 460, in which the I/O request is responded with zero data as the current data. As mentioned above, the current data being invalid means that the current data is out of use and can be internally wiped. According to one embodiment of the present disclosure, in response to the I/O request being a read operation, the zero data can be directly returned as the result of the read operation. According to another embodiment of the present disclosure, in response to the I/O request being a write operation, the zero data can be written into the stripe to replace the current data and write-in data included in the I/O request is written into the stripe into which the zero data has been written.

Hence, the validity of the correlated data in respective disks of the RAID can be determined integrally without determining separately for the respective disks of the RAID, which reduces disk access and enhances the overall I/O performance.

Figure 5:
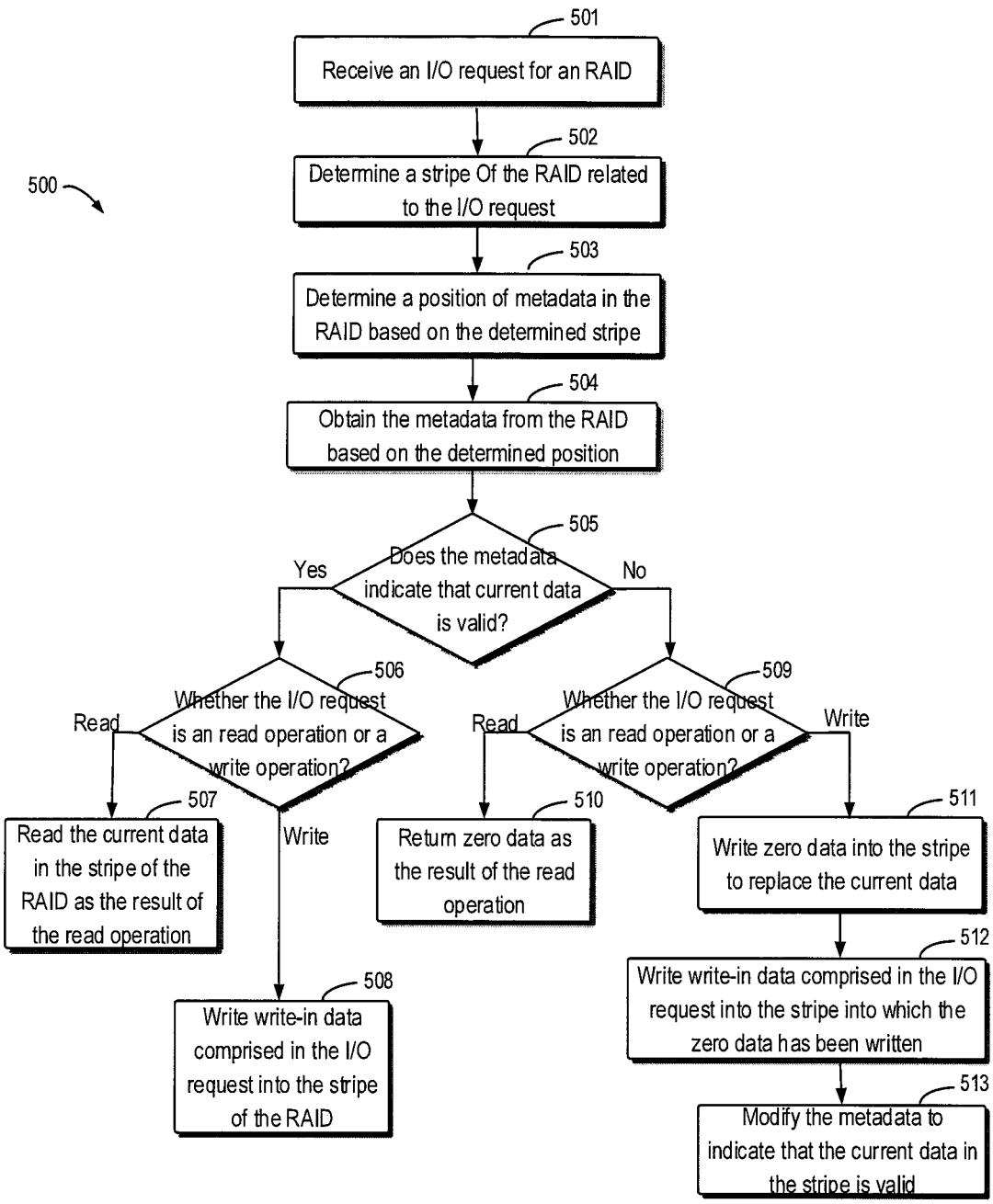
FIG. 5 illustrates a flowchart of a method for processing I/O requests in accordance with a further embodiment of the present disclosure.

FIG. 5 illustrates a flowchart of a method 500 for processing I/O requests in accordance with a further embodiment of the present disclosure. The method 500 also can be implemented, for example, at the SP 120 of FIG. 1. It should be appreciated that the method 500 can be implemented at any storage servers or storage terminals including the SP 120 of FIG. 1. Compared with the method 400, the method 500 by way of example illustrates a more detailed embodiment.

As shown in FIG. 5, at block 501, an I/O request for an RAID is received. At block 502, a stripe related to the I/O request in the RAID is determined. The processing of block 501 and block 502, which is similar to the processing of block 410 and block 420 as described above with reference to FIG. 4, will not be repeated here.

In the embodiment of FIG. 5, metadata is stored in the RAID. Then, the position of the metadata in the RAID is determined, at block 503, based on the stripe determined at block 502. For example, it is assumed that an offset of the metadata occurs at the position of 1000000 bytes, each data block is 1M bytes and the metadata size of each data block is 2 bytes, and the RAID is the RAID 110 shown in FIG. 1 having 4 data disks and 1 parity disk. In addition, it is assumed that the I/O request is intended to write data into 40M bytes. Then, the position of the metadata can be calculated as follows:

Due to the presence of 4 data disks, the size of each data block is 1M×4=4M; and the position of 40M bytes corresponds to the data block with the number of 40M/4M=10. Moreover, since the metadata of each data block is 2 bytes, the metadata offset corresponding to the data block 10 is 10×2=20 bytes. As the offset of the metadata for the RAID occurs at the position of 1000000 bytes, an offset of metadata corresponding to the I/O request is 1000000+

20=1000020 bytes. It should be appreciated that the above example is provided for the purpose of illustration only and does not restrict the present application.

At block 504, the metadata is obtained from the RAID based on the position determined at block 503. As shown in FIG. 3, assuming the I/O request 130 relates to the stripe 321, the position determined at 503 is the position of the metadata bit 311 corresponding to the data block 320. The corresponding metadata 0 of the stripe 321 can be read at this position.

At block 505, it is judged whether the obtained metadata indicates the current data as valid. If it is decided that the current data is valid, the method 500 enters the block 506 to judge whether the I/O request is a read operation or a write operation. For example, the judgment is made based on the request type or similar parameters in the I/O request. If it is decided, at the block 506, that the I/O request is a read operation, the method 500 enters the block 507 to read the current data in the stripe of the RAID as the result of the read operation. If it is decided, at block 506, that the I/O request is a write operation, the method 500 enters the block 508, where the write-in data included in the I/O request is written into the stripe of the RAID. Accordingly, after the judgment via the metadata at the block 505, if the metadata indicates the data as valid, the position of the stripe of the RAID on respective disks can be directly accessed to execute the read or write operation.

If it is decided, at block 505, that the current data is invalid, the method 500 enters the block 509 to judge whether the I/O request is a read operation or a write operation. The operation of block 509 is similar to that of block 506. If it is decided, at block 509, that the I/O request is the read operation, the method 500 enters the block 510 to directly return the zero data as the result of the read operation without accessing the RAID. If it is decided, at block 509, that the I/O request is the write operation, the method 500 enters the block 511 to write the zero data into the stripe of the RAID and to write the write-in data included in the I/O request into the stripe into which the zero data has been written at block 512, thereby the write operation is done.

At block 513, the metadata is modified to indicate that the current data in the stripe is valid for use in the subsequent processing. According to embodiments of the present disclosure, the processing of block 513 can be executed in response to deciding the I/O request as the write operation at the block 509. It should be understood that the processing of the block 513 can be executed simultaneously with, or before, or between or after the processings of blocks 511 and 512. The present application is not restricted in this regard.

According to the embodiment of FIG. 5, the validity of the correlated data in respective disks of the RAID can be determined integrally without determining separately for the respective disks of the RAID, which reduces disk access, improves the metadata cache efficiency and enhances the overall I/O performance. Moreover, the redundant protection is provided for the metadata, which further enhances the RAID reliability.

According to embodiments of the present disclosure, when the disks in the RAID fail, data recover on the disks can be performed with reference to the metadata. More details are provided below with reference to FIG. 6, which illustrates a flowchart of a method 600 for data recover in case of disk failure in the RAID in accordance with embodiments of the present disclosure. The method 600 also can be implemented, for example, at the SP 120 of FIG. 1. It should be appreciated that the method 600 can be implemented at any storage servers or storage terminals including the SP 120 of FIG. 1.

Figure 6:
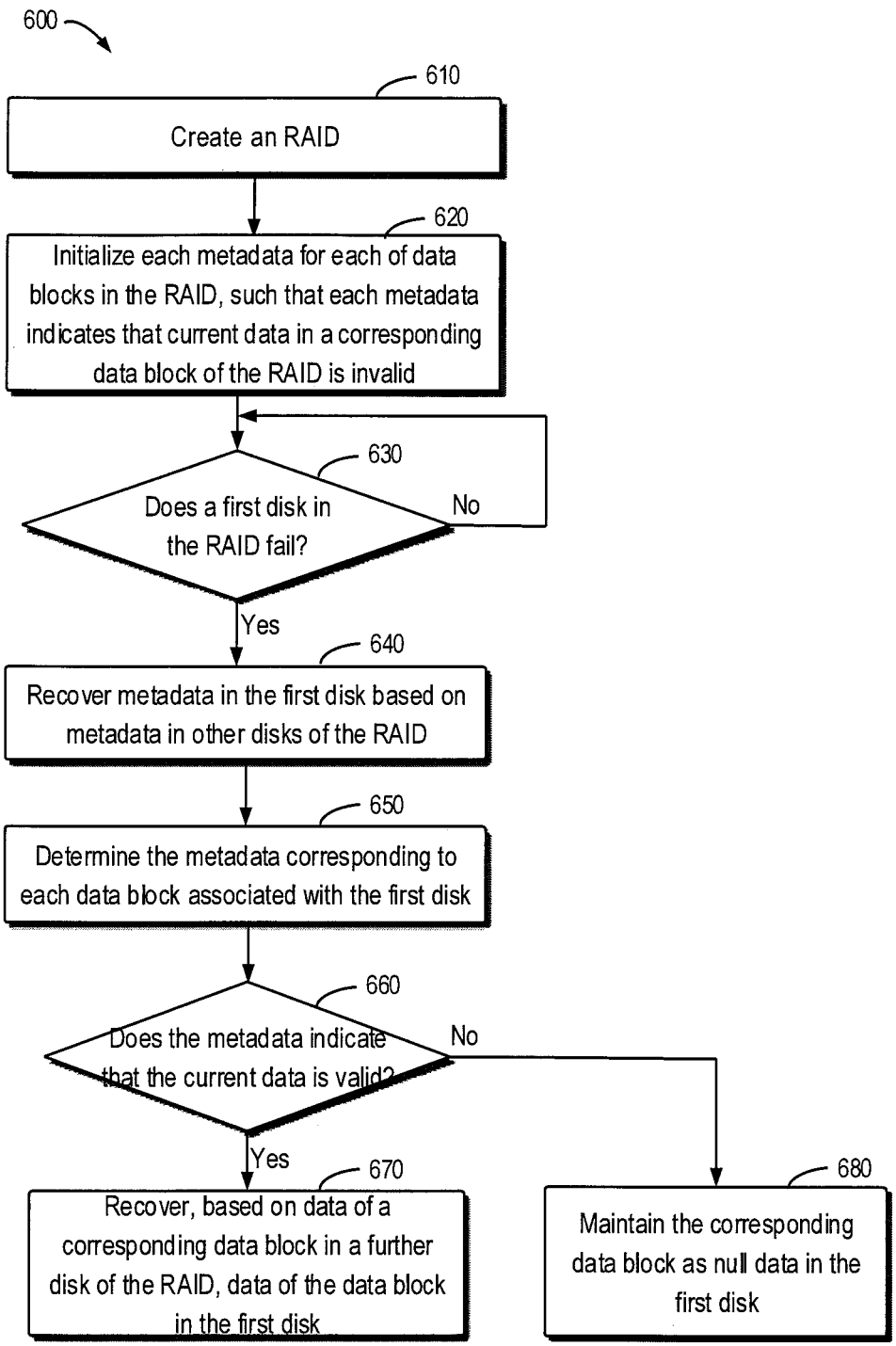
FIG. 6 illustrates a flowchart of a method for data recover in case of disk failure in the RAID in accordance with embodiments of the present disclosure.

As shown in FIG. 6, an RAID (e.g., the RAID 110 of FIG. 1) is created at block 610. As mentioned above, a plurality of physical drive components of the disk, for example, can be combined into one single logical unit to form the RAID.

In response to the creation of the RAID, each metadata for every data block in the RAID is initialized at block 620 to indicate that the current data in the corresponding data block of the RAID is invalid. It should be understood that the I/O request processing can be executed using the metadata after the initialization of the metadata, just as described above with reference to FIGS. 4 and 5.

During the processing of the I/O request, the metadata can be modified. As described above with reference to the block 513 of FIG. 5, the metadata can be modified from indicating invalid to indicating valid. In other embodiments, in response to an instruction for notifying that the data block is out of use from a user or an operating system, the metadata corresponding to the data block is modified from indicating valid to invalid. Therefore, the corresponding metadata can be maintained for the respective data blocks of the RAID to indicate the validity of the current data in the corresponding data block, so as to improve the I/O processing efficiency.

Return to FIG. 6. At block 630, it is judged whether a disk (also known as "a first disk" in the text) in the RAID fails. If it is decided that there lacks a faulted disk in the RAID, the monitoring over the disks in the RAID continues. If it is decided that there is a faulted first disk in the RAID, the method 600 enters the block 640, where the metadata in the first disk is recovered based on metadata in other disks of the RAID.

As mentioned above, metadata can be stored in the RAID. In this case, the metadata in the faulted first disk can be recovered through the operation of the block 640, so as to obtain the complete metadata for the RAID for use in subsequent data recover. The recover processing can be implemented by any suitable technologies, which are already known or to be developed in the future, and will not be repeated here to avoid confusing the present invention.

In other embodiments, the metadata also can be stored in a storage device apart from the RAID. In such case, the operation of block 640 is not required and in response to deciding that the first disk in the RAID fails at block 630, the method 600 directly enters the block 650.

At block 650, the metadata corresponding to each data block associated with the first disk is determined. According to embodiments of the present disclosure, data recover is executed from one data block to another. The processing of the block 650, which is similar to the processing as described above with reference to block 430 of FIG. 4, or blocks 503 and 504 of FIG. 5, will not be repeated here.

At block 660, it is judged whether the metadata determined at block 650 indicates that the current data is valid. If the current data is indicated as valid, the method 600 enters the block 670, where the data of the data block in the first disk is recovered based on the data of the corresponding data block in other disks of the RAID. The recover processing can employ the technique similar to the recover processing in the block 640 and will not be repeated here to avoid confusing the present invention.

If it is decided, at block 660, that the metadata indicates the current data being invalid, the method 600 enters the block 680 to maintain the corresponding metadata as null data in the first disk. Accordingly, the data on the faulted disk in the RAID can be rapidly recovered through the operations of blocks 650 to 680.

Compared with the traditional solution in which the I/O is executed on the basis of the metadata at the disk level, executing the I/O on the basis of the metadata at the RAID level in accordance with the embodiments of the present disclosure can reduce disk access and improve the I/O performance. As an example, Table 1 below illustrates comparison of disk access for the read I/O of the 4+1 RAID 5 when the metadata indicates that the current data is valid.

TABLE 1

| | Disk Access Number | | | |
|---|---|---|---|---|
| | 1 | 2 | 3 | 4 |
| Traditional Solution | 2 | 4 | 6 | 8 |
| Present Solution | 2 | 3 | 4 | 5 |
| Difference | 0% | −25% | −33% | −37.5% |

It can be seen from Table 1 that, with the solution of the embodiments of the present disclosure, the number of disk access for the read I/O of the 4+1 RAID 5 when the metadata indicates that the current data is valid can be reduced by up to 37.5%.

Table 2 below illustrates comparison of disk access for the write I/O of the 4+1 RAID 5 when the metadata indicates that the current data is valid.

TABLE 2

| | Disk Access Number | | | |
|---|---|---|---|---|
| | 1 | 2 | 3 | 4 |
| Traditional Solution | 8 | 12 | 12 | 10 |
| Present Solution | 5 | 7 | 6 | 6 |
| Difference | −37.5% | −41.7% | −50% | −40% |

It can be seen from Table 2 that, with the solution of the embodiments of the present disclosure, the number of disk access for the write I/O of the 4+1 RAID 5 when the metadata indicates that the current data is valid can be reduced by up to 50%.

Table 3 below illustrates comparison of disk access for the write I/O of the 4+1 RAID 5 when the metadata indicates that the current data is invalid.

TABLE 3

| | Disk Access Number | | | |
|---|---|---|---|---|
| | 1 | 2 | 3 | 4 |
| Traditional Solution | 8 + 2(0) | 12 + 3(0) | 14 + 4(0) | 15 + 5(0) |
| Present Solution | 6 + 5(0) | 7 + 5(0) | 8 + 5(0) | 9 + 5(0) |
| Difference | 10% | −20% | −27.8% | −30% |

It can be seen from Table 3 that, with the solution of the embodiments of the present disclosure, the number of disk access for the write I/O of the 4+1 RAID 5 when the metadata indicates that the current data is invalid can be reduced by up to 50%. It should be noted that the reason for the 10% reduction in Table 3 is that 0 should be written into 5 disks in the present solution when the metadata indicates invalid while 0 is only written into 2 disks in the traditional solution. The above situation occurs only when the user accesses the stripe for the first time. If the user accesses the stripe again, there is I/O for 5 disks only in the present solution as the metadata indicates valid at this moment. However, it is still required to write 0 into some disks in the traditional solution as only 2 disks are zeroed in the stripe and the disk access number is 8-10 times.

Table 4 below illustrates comparison of the size of the cached data for different RAID types. In this example, the cache size for the metadata is selected as 4 KB regarding every disk.

TABLE 4

| RAID Type | Cache per disk | Total Cache | Cached data (traditional solution) | Cached data (present solution) | Difference |
|---|---|---|---|---|---|
| R1 (2 disks) | 4 KB | 8 KB | 32 GB | 128 GB | 400% |
| R10 (4 + 4) | 4 KB | 32 KB | 128 GB | 1024 GB | 800% |
| R5 (4 + 1) | 4 KB | 20 KB | 128 GB | 640 GB | 400% |
| R5 (8 + 1) | 4 KB | 36 KB | 256 GB | 2304 GB | 800% |
| R6 (8 + 2) | 4 KB | 40 KB | 256 GB | 2304 GB | 800% |

By taking 4+1 RAID 5 as an example, each disk has the metadata cache of 4 KB, so 20 KB cache is required. Regarding the traditional solution, each metadata bit represents validity of 1 MB data in one disk and the parity disk does not cache any useful user data. Accordingly, the total cached data is 4×4 KB×8 bit×1 MB=128 GB. Regarding the present solution, each metadata bit represents 1 MB stripe, i.e., validity of 4 MB user data. Besides, the present solution does not waste the cache on the parity disk. Therefore, the total cached data is 20 KB×8 bit×4 MB=640 GB. It can be seen from Table 4 that the metadata cache efficiency increases dramatically.

To sum up, the I/O management solution in accordance with embodiments of the present disclosure maintains the metadata indicative of data validity at an RAID level, which can reduce the disk access, greatly increase the metadata cache efficiency, improve the I/O performance and enhance the reliability of an RAID.

Figure 7:
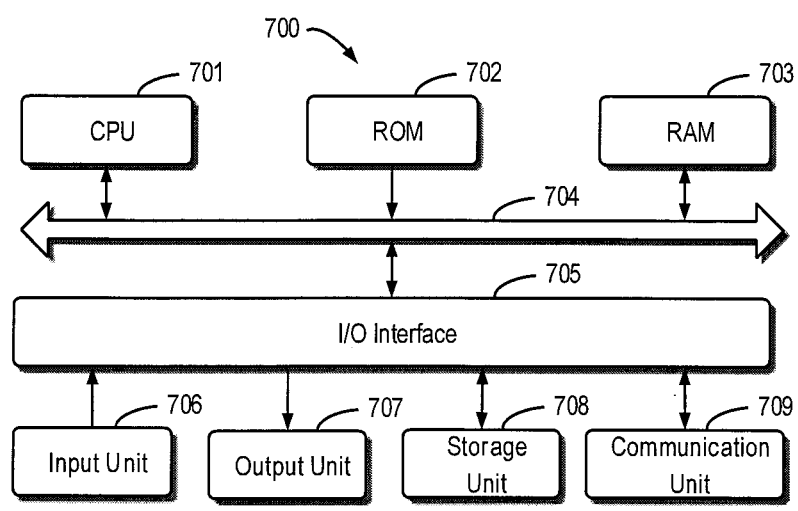
FIG. 7 illustrates a block diagram of an electronic device where embodiments of the present disclosure can be implemented.

FIG. 7 illustrates a schematic block diagram of an example computing device 700 for implementing embodiments of the present disclosure. The device 700 can perform the method with reference to FIGS. 4 to 6. As shown, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as memory and optical disk etc.; and a communication unit 709, such as network card, modem, wireless transceiver and the like. The communication unit 709 allows the device 700 to exchange information/data with other devices via the computer network, such as Internet, and/or various telecommunication networks.

The processing unit 701 executes the above described each method and processing, such as methods 400-600. For example, in some embodiments, the methods 400-600 can be implemented as computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more steps of the above described methods 400-600 can be implemented. Alternatively, in other embodiments, the CPU 701 can be configured via any other suitable ways (e.g., by means of firmware) to execute the methods 400-600.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a peer machine or entirely on the peer machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A method of input/output (I/O) management, the method comprising:
    in response to receiving an I/O request for a redundant array of independent disks (RAID), determining a stripe of the RAID related to the I/O request;
    determining metadata corresponding to the stripe, the metadata indicating validity of current data in a corresponding data block of the RAID, the data block comprising one or more stripes, wherein the metadata corresponding to the stripe comprises an individual bit indicating validity of the corresponding data block of the RAID;
    in response to the metadata indicating that the current data is valid, executing the I/O request by accessing the RAID; and
    in response to the metadata indicating that the current data is invalid and the I/O request being a read operation for the stripe of the RAID related to the I/O request, responding to the I/O request by directly returning zero data as a result of the read operation without reading any disk in the RAID, wherein the metadata was previously modified from indicating that the corresponding data block was valid to indicating that the corresponding data block is invalid by an instruction from a user, wherein the instruction from the user comprises a notification received from the user indicating that the corresponding data block is out of use.

2. The method of claim 1, wherein determining the metadata comprises:
    determining a position of the metadata in the RAID based on the determined stripe; and
    obtaining the metadata from the RAID based on the determined position.

3. The method of claim 1, wherein executing the I/O request comprises:
    in response to the I/O request being a read operation, reading the current data in the stripe of the RAID as a result of the read operation; and
    in response to the I/O request being a write operation, writing write-in data comprised in the I/O request into the stripe of the RAID.

4. The method of claim 1, wherein responding to the I/O request with zero data as the current data comprises:
    in response to the I/O request being a write operation, writing the zero data into the stripe to replace the current data, and
    writing write-in data comprised in the I/O request into the stripe into which the zero data has been written.

5. The method of claim 4, further comprising:
    in response to the I/O request being the write operation, modifying the metadata to indicate that the current data in the stripe is valid.

6. The method of claim 1, further comprising:
    in response to creation of the RAID, initializing each metadata for each of data blocks in the RAID, such that each metadata indicates that current data in the corresponding data block of the RAID is invalid.

7. The method of claim 1, further comprising:
    in response to failure of a first disk in the RAID, recovering metadata in the first disk based on metadata in a further disk of the RAID.

8. The method of claim 1, further comprising:
    in response to failure of a first disk in the RAID, determining the metadata corresponding to each of data blocks associated with the first disk; and
    recovering, based on the determined metadata, data in each of data blocks associated with the first disk.

9. The method of claim 8, wherein recovering the data comprises:
in response to the metadata indicating that the current data is valid, recovering the data of the data block in the first disk based on data of a corresponding data block in a further disk of the RAID; and
in response to the metadata indicating that the current data is invalid, maintaining the data block as null data in the first disk.

10. The method of claim 1, wherein the metadata indicating that the data is invalid further indicates that the corresponding data block is capable of being internally wiped.

11. The method of claim 10, wherein the metadata indicating that the data is invalid further indicates that the corresponding data block is unmapped.

12. An electronic device, comprising:
a processing unit; and
a memory storing instructions which, when executed by the processing unit, cause the electronic device to:
in response to receiving an input/output (I/O) request for a redundant array of independent disks (RAID), determine a stripe of the RAID related to the I/O request,
determine metadata corresponding to the stripe, the metadata indicating validity of current data in a corresponding data block of the RAID, the data block comprising one or more stripes, wherein the metadata corresponding to the stripe comprises an individual bit indicating validity of the corresponding data block of the RAID,
in response to the metadata indicating that the current data is valid, execute the I/O request by accessing the RAID, and
in response to the metadata indicating that the current data is invalid and the I/O request being a read operation for the stripe of the RAID related to the I/O request, respond to the I/O request by directly returning zero data as a result of the read operation without reading any disk in the RAID, wherein the metadata was previously modified from indicating that the corresponding data block was valid to indicating that the corresponding data block is invalid by an instruction from a user, wherein the instruction from the user comprises a notification received from the user indicating that the corresponding data block is out of use.

13. The electronic device of claim 12, wherein the memory further stores instructions which, when executed by the processing unit, cause the electronic device to:
determine a position of the metadata in the RAID based on the determined stripe; and
obtain the metadata from the RAID based on the determined position.

14. The electronic device of claim 12, wherein the memory further stores instructions which, when executed by the processing unit, cause the electronic device to:
in response to the I/O request being a read operation, read the current data in the stripe of the RAID as a result of the read operation; and
in response to the I/O request being a write operation, write write-in data comprised in the I/O request into the stripe of the RAID.

15. The electronic device of claim 12, wherein the memory further stores instructions which, when executed by the processing unit, cause the electronic device to:
in response to the I/O request being a write operation, write the zero data into the stripe to replace the current data, and
write write-in data comprised in the I/O request into the stripe into which the zero data has been written.

16. The electronic device of claim 15, wherein the memory further stores instructions which, when executed by the processing unit, cause the electronic device to:
in response to the I/O request being the write operation, modify the metadata to indicate that the current data in the stripe is valid.

17. The electronic device of claim 12, wherein the memory further stores instructions which, when executed by the processing unit, cause the electronic device to:
in response to creation of the RAID, initialize each metadata for each of data blocks in the RAID, such that each metadata indicates that current data in the corresponding data block of the RAID is invalid.

18. The electronic device of claim 12, wherein the memory further stores instructions which, when executed by the processing unit, cause the electronic device to:
in response to failure of a first disk in the RAID, recover metadata in the first disk based on metadata in a further disk of the RAID.

19. The electronic device of claim 12, wherein the memory further stores instructions which, when executed by the processing unit, cause the electronic device to:
in response to failure of a first disk in the RAID, determine the metadata corresponding to each of data blocks associated with the first disk; and
recover, based on the determined metadata, data in each of data blocks associated with the first disk.

20. The electronic device of claim 19, wherein the memory further stores instructions which, when executed by the processing unit, cause the electronic device to:
in response to the metadata indicating that the current data is valid, recover the data of the data block in the first disk based on data of a corresponding data block in a further disk of the RAID; and
in response to the metadata indicating that the current data is invalid, maintain the data block as null data in the first disk.

21. A computer program product having a non-transitory computer readable medium which stores a set of instructions to perform input/output (I/O) management; the set of instructions, when carried out by computerized circuitry, causing the computerized circuitry to perform a method of:
in response to receiving an I/O request for a redundant array of independent disks (RAID), determining a stripe of the RAID related to the I/O request;
determining metadata corresponding to the stripe, the metadata indicating validity of current data in a corresponding data block of the RAID, the data block comprising one or more stripes, wherein the metadata corresponding to the stripe comprises an individual bit indicating validity of the corresponding data block of the RAID;
in response to the metadata indicating that the current data is valid, executing the I/O request by accessing the RAID; and
in response to the metadata indicating that the current data is invalid and the I/O request being a read operation for the stripe of the RAID related to the I/O request, responding to the I/O request by directly returning zero data as a result of the read operation without reading any disk in the RAID, wherein the metadata was previously modified from indicating that the corresponding data block was valid to indicating that the corresponding data block is invalid by an instruction from a user, wherein the instruction from the user comprises a notification received from the user indicating that the corresponding data block is out of use.

* * * * *